US012240238B2

(12) United States Patent
Beach et al.

(10) Patent No.: US 12,240,238 B2
(45) Date of Patent: Mar. 4, 2025

(54) CONTROL OF LASER PRINTHEAD FOR WRITING OR ERASING CONTENT

(71) Applicant: ZEBRA TECHNOLOGIES CORPORATION, Lincolnshire, IL (US)

(72) Inventors: Robert E. Beach, Los Altos, CA (US); Chinmay Nanda, Central Islip, NY (US); Richard Mark Clayton, Manorville, NY (US); Paul Seiter, Port Jefferson Station, NY (US); Patrick Martin Brown, North Medford, NY (US); John J. Bozeki, Elgin, IL (US); Lucjan K. Perlowski, Wheatley Heights, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/389,164

(22) Filed: Nov. 13, 2023

(65) Prior Publication Data

US 2024/0075739 A1 Mar. 7, 2024

Related U.S. Application Data

(62) Division of application No. 16/855,742, filed on Apr. 22, 2020, now Pat. No. 11,850,853.

(51) Int. Cl.

| | |
|---|---|
| ***B41J 2/14*** | (2006.01) |
| ***B41J 2/04*** | (2006.01) |
| ***B41J 2/16*** | (2006.01) |
| ***B41J 2/47*** | (2006.01) |
| ***B41J 2/475*** | (2006.01) |
| ***B41J 3/407*** | (2006.01) |
| *B41M 5/26* | (2006.01) |
| *B41M 7/00* | (2006.01) |

(52) U.S. Cl.
CPC ............ *B41J 2/14104* (2013.01); *B41J 2/04* (2013.01); *B41J 2/1634* (2013.01); *B41J 2/47* (2013.01); *B41J 2/475* (2013.01); *B41J 3/4075* (2013.01); *B41M 5/26* (2013.01); *B41M 7/0009* (2013.01)

(58) Field of Classification Search
CPC . B41J 2/14104; B41J 2/47; B41J 2/475; B41J 3/4075; B41J 2002/4756; B41J 2/4753; B41M 5/26; B41M 7/0009; H01S 3/00; H01S 3/10
See application file for complete search history.

(56) References Cited

U.S. PATENT DOCUMENTS

2010/0309279 A1* 12/2010 Tamkin .................. F21V 13/04 347/225
2012/0211673 A1* 8/2012 Yamamoto ............... B41J 2/473 250/492.1

* cited by examiner

*Primary Examiner* — Kristal Feggins

(57) ABSTRACT

A label modification unit may receive a label modification input that indicates a label modification associated with content being written to a label or erased from the label. The label modification unit may identify an area of the label that is associated with the label modification according to the label modification input. The label modification unit may determine, based on a size of the area, a spot size of a light beam that is configured to be emitted by a laser printhead to modify the content within the area. The label modification unit may determine, based on the spot size and the content, an optical path configuration for the laser printhead. The label modification unit may operate the laser printhead according to the optical path configuration to write the content to the area or erase the content from the area.

6 Claims, 8 Drawing Sheets

CONTROL OF LASER PRINTHEAD FOR WRITING OR ERASING CONTENT

CROSS-REFERENCE TO RELATED APPLICATIONS

This application is a divisional of U.S. patent application Ser. No. 16/855,742, filed on Apr. 22, 2020, and incorporated herein by reference in its entirety.

BACKGROUND

Laser printing involves the production of text and graphics by passing a light beam over a material. Laser attributes may be varied to write or erase content using the light beam. A laser printhead can be configured to either write or erase content from a rewriteable label based on photothermal properties of the rewriteable label. For example, the laser printhead may be preconfigured to emit the light beam at one power level or with one spot size to write content to the rewriteable label, or the laser printhead can be preconfigured to emit the light beam at another power level or with another spot size to erase content from the rewriteable label. Including multiple laser printheads increases hardware resources and complexities associated with controlling multiple laser printheads to write and erase content. Furthermore, such increased hardware resources and/or complexities add weight, cause physical design constraints, and/or reduce efficiencies of a system that is to be able to write and erase content. Therefore, there is a need to enable a same laser printhead to both write and erase content.

SUMMARY

According to some implementations, a method may include receiving a label modification input that indicates a label modification associated with content being written to a rewriteable label or erased from the label; an area of the label that is associated with the label modification according to the label modification input; determining, based on a size of the area, a spot size of a light beam that is configured to be emitted by a laser printhead to modify the content within the area; determining, based on the spot size and the content, an optical path configuration for the laser printhead; and operating the laser printhead according to the optical path configuration to write the content to the area or erase the content from the area.

According to some implementations, a device may include a memory and a processor, communicatively coupled to the memory, configured to: receive a label modification input associated with modifying content in an area of a label; determine, based on a size of the area, a spot size of a light beam that is configured to be emitted by a laser to modify the content within the area; determine, based on the spot size and the content, a laser configuration for the laser; and operate the laser according to the laser configuration to modify the content in the area.

According to some implementations, a label modification unit may include a single laser configured to emit a light beam to modify a label; an optical element configured to control a spot size of the light beam based on a position of the optical element relative to the laser; a reflector system configured to control directional movement of the light beam; and a controller configured to: receive a label modification input associated with modifying an area of the label; determine, based on the label modification input and a physical configuration of the label, a size of the area and a label modification to the area; and cause the label modification in the area by controlling a configuration of the single laser, the optical element, or the reflector system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts that include the claimed invention, and explain various principles and advantages of those implementations.

Figure 1A:
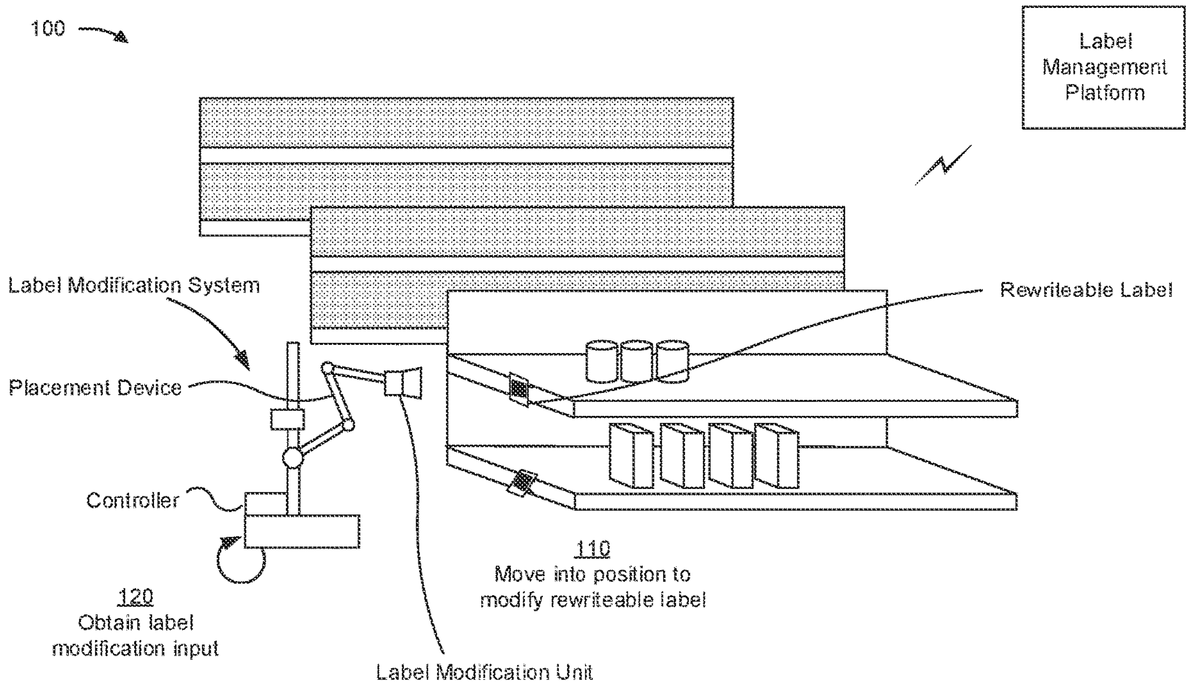
FIGS. 1A and 1B are diagrams of one or more example implementations for control of a laser printhead for writing or erasing content.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In some instances, a label modification unit may be configured with a set of laser printheads to permit the label modification unit to modify a label (e.g., a rewriteable label). In such cases, the label modification unit may include a plurality of laser printheads that are individually configured to write or erase the content. More specifically, one of the plurality of laser printheads may be configured to write content and another one of the plurality of laser printheads may be configured to erase content. In some cases, multiple laser printheads of the plurality of laser printheads can be included to print content to different sizes of areas of the label. However, in some cases, the plurality of laser printheads may be utilized within a mobile and/or navigable device (e.g., an autonomously controlled device) that is to modify one or more rewriteable labels within an environment. Including the plurality of laser printheads on such a device can add considerable weight and/or complexity to the device.

Some implementations described herein provide a label modification unit that includes a laser printhead with a laser, a variable optical element, a reflector system, and a controller that enables the laser printhead to both write content to or erase content from a rewriteable label. In this way, relative to previous techniques, the label modification unit can reduce hardware resources (e.g., by reducing hardware required for a quantity of required laser printheads) and/or improve efficiencies relative to previous techniques (e.g., by reducing a weight and/or size of a device that is to utilize the laser printhead).

Figure 1B:
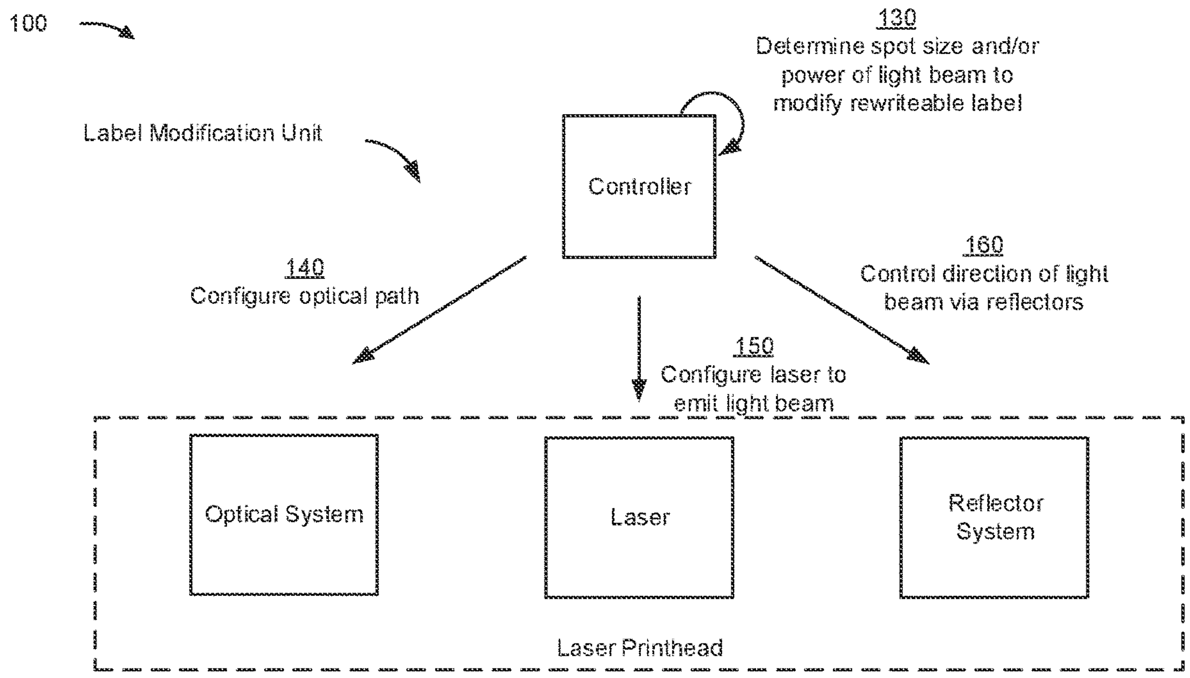

FIGS. 1A and 1B are diagrams of an example implementation 100 described herein. Example implementation 100 illustrates example control of a laser printhead for writing or erasing content described herein. Example implementation 100 includes a label modification system, a label management platform, and a rewriteable label positioned within an environment. The rewriteable label may be one of a plurality of labels in the environment. The environment may be associated with an entity (e.g., an individual or organization) that stores, manages, rents, and/or sells goods or products that are to be identified by the rewriteable labels (e.g., according to information received from the label management platform).

As shown in FIG. 1A, the label modification system includes a label modification unit, a placement device, and a controller. As described herein, the label modification system may be used to modify (e.g., autonomously and/or semi-autonomously) labels (e.g., the identified rewriteable label) in a setting with a plurality of rewriteable labels, such as in a retail store, a warehouse, and/or the like. For example, the controller, based on information and/or instructions from the label management platform, may control the label modification system to modify the rewriteable labels, as described herein.

While certain actions and/or operations are described in connection with example implementation 100 as being performed by the controller, such actions and/or operations may be similarly performed and/or caused to be performed by the label management platform. The controller may include one or more memories and/or processors configured to receive, generate, process, and/or transmit information (e.g., controls, instructions, and/or the like) associated with modification of the rewriteable label, as described herein. For example, as described herein, the controller may be used to operate components on the label modification system, such as one or more components of the placement device, one or more components of the laser printhead, and/or the like.

The label management platform may include one or more devices that manage label information associated with the labels in the environment. The information may include label information, such as location information that identifies a location of a label, information associated with content of a label, information associated with modifying a label, and/or the like. In some implementations, label management platform may receive information from and/or transmit information to label modification system.

The rewriteable label includes a material that is able to support print and be used to display content. For example, the label may include a photothermal material that reacts to different temperatures, such that a light beam may be used to monochromatically write and/or erase content to the rewriteable label.

As shown in FIG. 1A, and by reference number 110, the label modification system moves into a position to use the label modification unit to modify to the rewriteable labels. For example, the controller may control one or more devices (e.g., sensors, drives, and/or the like) of the label modification system to navigate the label modification system to the rewriteable labels and/or position the placement device in association with the rewriteable labels.

According to some implementations, the label modification system may move into position based on position information (e.g., aisle, shelf, and/or bin information) and/or instructions from the label management platform. For example, the label management platform may provide label information to the label modification system. The label information may include and/or identify one or more of content that is to be included on the rewriteable labels, identifiers of the rewriteable labels, locations of the rewriteable labels, and/or the like. Accordingly, based on processing the label information and/or identifying an aisle, shelf, and/or bin location of the label, the controller may maneuver the label modification system into a position that permits the placement device and/or the label modification unit to access and modify the upper label and/or lower label.

The placement device includes one or more components to move one or more devices of the label modification system. For example, the placement device may include one or more mechanical arms, one or more actuators, one or more drives, one or more motors, and/or the like. The placement device is attached to a laser printer assembly (shown as being attached at a distal end of the placement device) of the label modification unit.

In this way, the label modification system may be navigated to the rewriteable label to permit the label modification system to be positioned to modify the rewriteable label, as described herein.

As further shown in FIG. 1A, and by reference number 120, the label modification system may obtain a label modification input. The label modification input may include information used by the label modification system to determine a label modification associated with modifying the rewriteable label (e.g., information that indicates whether to modify the rewriteable label, information associated with how to modify the rewriteable label, and/or the like). For example, the label modification input may include information regarding an area of the rewriteable label to be modified, content that is currently present on the rewriteable label, content to be written onto the rewriteable label, and/or the like. In some implementations, the label modification input may include information that indicates areas of the rewriteable label to erase content and/or areas of the rewriteable label to write new content. The label modification input may be obtained from the label management platform and used by the label modification system to perform label modification.

As shown in FIG. 1B, and by reference number 130, the controller (which may correspond to the controller of the label modification system and/or a controller of the label modification unit) may determine a spot size and/or power of a light beam to modify the rewriteable label. For example, based on the label modification input, the controller may determine a spot size and/or power level of the light beam to modify one or more areas of the rewriteable label to determine a corresponding optical path configuration of the laser printhead. The controller may determine the optical path configuration for modifying certain areas based on whether the areas are to be modified with a particular spot size and/or power level, based on whether a write operation or erase operation is to be performed in the area of the rewriteable label. More specifically, the controller may determine the spot size based on size of the area that is to be modified, one or more dimensions (e.g., a length and/or a width) of one or more portions (e.g., lines, characters, shapes, and/or the like) of the content that is to be written to the rewriteable label or erased from the rewriteable label, and/or the like. In such cases, the controller may analyze a quantity of pixels associated with the area and/or the content that is to be modified, and determine the size of the area and/or dimensions of the content based on the quantity of pixels (and/or layout of the pixels).

In some implementations, the controller may determine one or more dimensions of the content that is to be modified on the rewriteable label based on a physical configuration (e.g., size and/or shape) of the rewriteable label. The controller may determine the physical configuration of the rewriteable label based on an identifier associated with the label, based on label information received from the label management platform, and/or any other preconfigured information associated with the rewriteable label. In some implementations, the controller may determine the physical configuration of the rewriteable label based on an analysis of the rewriteable label. For example, using information from one or more sensors of the label modification system, the controller may be configured to identify (e.g., using an image processing technique) the rewriteable labels and/or a physical configuration (e.g., size and/or shape) of the rewriteable labels. The one or more sensors may include a camera (e.g., a digital color camera, a greyscale camera, an infrared camera, an ultraviolet camera, and/or the like), a scanner (e.g., an optical scanner, a barcode scanner, and/or the like) to scan or identify an identifier of the rewriteable label, a ranging sensor (e.g., a light detection and ranging sensor (LIDAR), a radio detection and ranging sensor (radar), and/or the like), and/or the like. More specifically, an image sensor may capture and provide an image that depicts the rewriteable label to the controller. The controller may analyze the image (e.g., using an edge detection technique, an object detection technique, an object recognition technique, and/or the like) to determine the physical configuration based on determined dimensions of the rewriteable label from the image. Based on the physical configuration, the controller may determine that dimensions of the content of the rewriteable label are to be proportionately increased and/or proportionately decreased relative to size information of the content provided in the label modification input.

In some implementations, the controller may determine the spot size based on a range of power levels of a light beam that can be emitted the laser (e.g., according to a range of available power being supplied to the laser) and/or the ability of the optical system to vary the spot size of the light beam. Additionally, or alternatively, the spot size and/or power may be determined based on a temperature profile for writing content to or erasing content from an area of the rewriteable label. For example, the controller may be configured with one or more temperature profiles to write to the rewriteable label (and/or any other rewriteable label in the environment of the label modification system) or erase content from the rewriteable label. In some implementations, an area of the rewriteable label of example implementation 100 can be written to when the area reaches a relatively high temperature (e.g., greater than 170 degrees Celsius (° C.)) and is cooled at a corresponding write rate, while content from the area can be erased when the area reaches a relatively low temperature (e.g., 150° C.-170° C.) and is cooled at a corresponding erase rate. In some implementations, cooling an area relatively quickly may cause content to be written (e.g., monochromatically), whereas cooling an area relatively slowly may allow content to be erased from the rewriteable label. Accordingly, the controller may maintain one or more temperature profiles that identify specifications for modifying (e.g., writing content or erasing content) a particular rewriteable label. Such specifications may include a desired write temperature and/or write cooling rate for writing with a particular spot size and/or to an area having a particular size. Similarly, the temperature profile may include a desired erase temperature and/or erase cooling rate for erasing with a particular spot size and/or from an area having a particular size.

According to some implementations, the spot size can be controlled to affect a particular power level. For example, a relatively smaller spot size in conjunction with the particular power level may allow an area of the rewriteable label to reach a relatively higher temperature and/or reach a particular temperature more quickly than a relatively larger spot size, because the photothermal energy of the light beam is focused onto a smaller area. That is, the controller can increase a power density of the light beam, resulting in a corresponding increase in temperature of an area of the rewriteable label that is receiving the light beam. Similarly, a relatively larger spot size of a light beam in conjunction with the particular power level, may not allow the light beam to cause a corresponding area of the rewriteable label to reach a relatively higher temperature and/or may require a longer dwell time to heat the area to the relatively higher temperature.

As further shown in FIG. 1B, and by reference number 140, the controller configures an optical path of the optical system. For example, the controller may determine an optical path configuration of the optical system that is to provide a light beam with the determined spot size and/or power level to modify a particular area of the rewriteable label. The controller may then configure the optical system (and/or other components of the laser printhead) according to the optical path configuration.

Configuring an optical path may include controlling one or more optical elements of the optical system according to the temperature profiles for modifying the area based on the spot size. For example, the controller may configure the optical path according to the specifications of the temperature profiles. Configuring an optical path may include adjusting a focus of a variable optical element to alter a spot size, a shape, and/or the like of a light beam that passes through the optical system. The controller may control the optical system to configure the spot size and/or power density of the light beam as a function of time or another variable.

As further shown in FIG. 1B, and by reference number 150, the controller may configure a laser to emit a light beam. The controller may configure the laser to output a light beam at a particular power level (e.g., by supplying a corresponding amount of power to the laser) associated with the spot size to modify an area of the rewriteable label. In some implementations, the controller may configure the laser to emit the light beam or vary the power level of the light beam as a function of time, frequency, and/or the like.

As further shown in FIG. 1B, and by reference number 160, the controller may control a direction of light beam (e.g., the light beam emitted by the laser) via the reflector system. For example, the reflector system may include one or more mirrors (e.g., one or more galvanic mirrors) configured to reflect or redirect a light beam at a particular angle or toward a particular direction.

The controller may dynamically control the reflectors of the reflector system to align the light beam with an area of the rewriteable label and move the light beam across the rewriteable label to other areas to form a particular pattern (e.g., a monochromatic pattern), thereby writing content to and/or erasing content from the rewriteable label. In some implementations, the controller may vary a dwell time (e.g., a time in which a light beam dwells at a location on the label), a step size (e.g., an amount by which the light beam is moved as a function of time), and/or the like.

According to some implementations, in association with the temperature profiles and/or the specifications for modifying an area of the rewriteable label, the controller may include corresponding dwell times (e.g., time durations to heat the area to the desired temperature), light beam movement rates (e.g., to control the cooling rate of the area of the rewriteable label), and/or the like that can be used by the controller to control the laser printhead to emit the light beam and/or cause one or more areas of the rewriteable label to reach the desired specifications to modify the rewriteable label, as described herein. Accordingly, the controller may vary the dwell time and/or the step size to manipulate how quickly an area on the rewriteable label is heated and/or cooled to correspondingly modify the content of the area.

In this way, control of the components of the laser printhead, as described herein, may allow a single laser and/or a single laser printhead to adjust a light beam in various ways to allow writing and/or erasing of content.

The number and arrangement of devices and components shown in FIGS. 1A and 1B are provided as one or more examples. In practice, there may be additional devices and/or components, fewer devices and/or components, different devices and/or components, or differently arranged devices and/or components than those shown in FIGS. 1A and 1B. Furthermore, two or more devices or components shown in FIGS. 1A and 1B may be implemented within a single device or component, or a single device or component shown in FIGS. 1A and 1B may be implemented as multiple, distributed devices or components. Additionally, or alternatively, a set of devices or components shown in FIGS. 1A and 1B may perform one or more functions described as being performed by another set of devices or components shown in FIGS. 1A and 1B.

Figure 2:
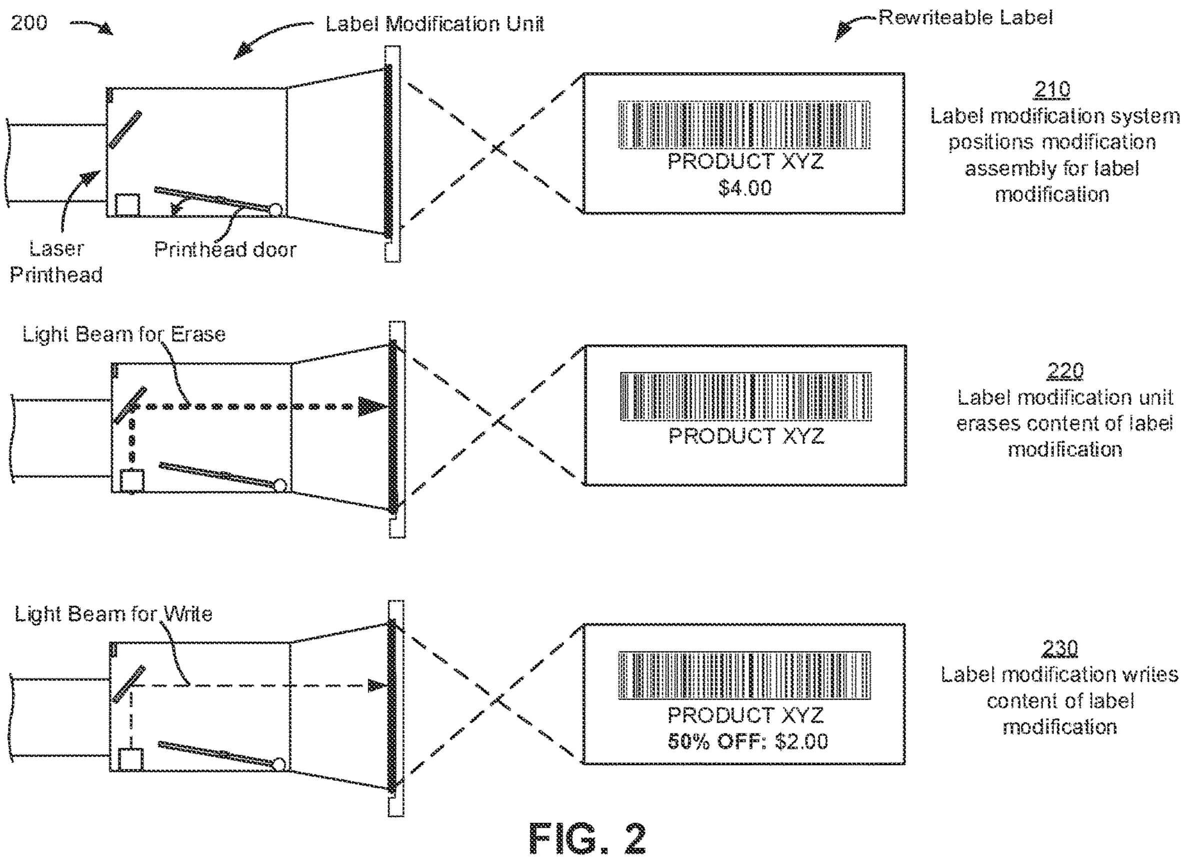
FIG. 2 is a diagram of an example implementation associated with controlling a light beam for label modification, as described herein.

FIG. 2 is a diagram of an example implementation 200 associated with controlling a light beam for label modification, as described herein. Example implementation 200 illustrates a label modification unit (e.g., the label modification unit of the label modification system described in connection with example implementation 100) adjusting a light beam of a laser printhead (and/or laser) during a label modification of a rewriteable label that includes both a write operation and an erase operation. The rewriteable label may include a photothermal material or other thermally sensitive material, which results in a change of color (e.g., a monochromatic change of color) based on temperature changes to the material. This property of the photothermal material may allow content to be written and/or erased on the label. In example implementation 200, a label modification unit is controlled to adjust content on rewriteable label. More specifically, as described below, the label modification unit may modify the rewriteable label to display promotional information and/or a price reduction to a product (as shown in FIG. 2 by the product identifier "PRODUCT XYZ") associated with and/or identified by the rewriteable label. The label modification unit may perform the label modification of example implementation 200 based on receiving a label modification input (e.g., from a user, from a label management platform, and/or the like).

As shown in FIG. 2, and by reference number 210, a label modification system may position the label modification unit for label modification. For example, the label modification system may align the label modification unit with the rewriteable label using a placement device to permit the laser to modify the rewriteable label. Additionally, or alternatively, the label modification system may control one or more components of the label modification unit to enable modification of the rewriteable label. More specifically, the label modification system may open a printhead door of the label modification unit to permit the light beam to reach the rewriteable label.

As further shown in FIG. 2, and by reference number 220, the label modification unit erases content associated the with label modification from the rewriteable label. For example, the label modification unit may erase content that was previously written to and/or displayed on the rewriteable label. As shown, relative to the rewriteable label associated with reference number 210, the label modification unit erases the price ("$4.00") of the product displayed on the label.

To erase the content, the label modification unit may correspondingly configure the laser printhead to emit the light beam with a particular spot size and/or power level to erase the price. Additionally, or alternatively, the label modification unit may control dwell time and/or a movement rate of the light beam to erase the price. As described herein, the label modification unit may determine such specifications based on determining that the price is to be erased, dimensions of the price (e.g., a font, a font size, and/or physical size of "$4.00"), physical dimensions of the rewriteable label, and/or the like.

According to some implementations, the controller may determine that the price is to be erased based on a comparison of the content displayed on the rewriteable label and the content that is to be written to the rewriteable label (as described below). For example, the controller may be configured to preprocess the label modification input relative to the content displayed on the label, correspondingly, only erase content from the rewriteable label that is determined to be different from content that is to be written to the rewriteable label. Accordingly, in example implementation 200, the controller may determine that, while the barcode and product identifiers are the same between the displayed content and the content that is to be written, the content below the product identifier is different. The controller may identify and/or determine the difference using any suitable image processing technique and/or content analysis technique (e.g., object detection, object recognition, edge detection, optical character recognition, natural language processing, and/or the like).

In this way, the label modification unit may erase certain content from the rewriteable label during a label modification.

As further shown in FIG. 2, and by reference number 230, the label modification unit writes content associated with the label modification to the rewriteable label. In some implementations, the content that is written to the rewriteable label may be content that is different from the content that was previously written to or displayed on the rewriteable label. As shown, the label modification unit writes the promotional information ("50% OFF:") and a promotional price ("$2.00").

To write the content the label modification unit may correspondingly configure the laser printhead to emit a light beam with a particular spot size and/or power level to write the promotional information and/or promotional price. Additionally, or alternatively, the label modification unit may control dwell time and/or a movement rate of the light beam to write the price. As described herein, the label modification unit may determine such specifications based on determining that the promotional information and promotional price are to be written, dimensions of the promotional information and/or promotional price (e.g., a font, a font style, a font size, and/or physical size of "50% OFF: $2.00"), the physical dimensions of the rewriteable label, and/or the like.

In this way, the label modification unit may write certain content from the rewriteable label during a label modification using a same laser printhead that is used to erase content from the rewriteable label during the label modification.

As indicated above, FIG. 2 is provided merely as an example. Other examples may differ from what is described with regard to FIG. 2.

Figure 3:
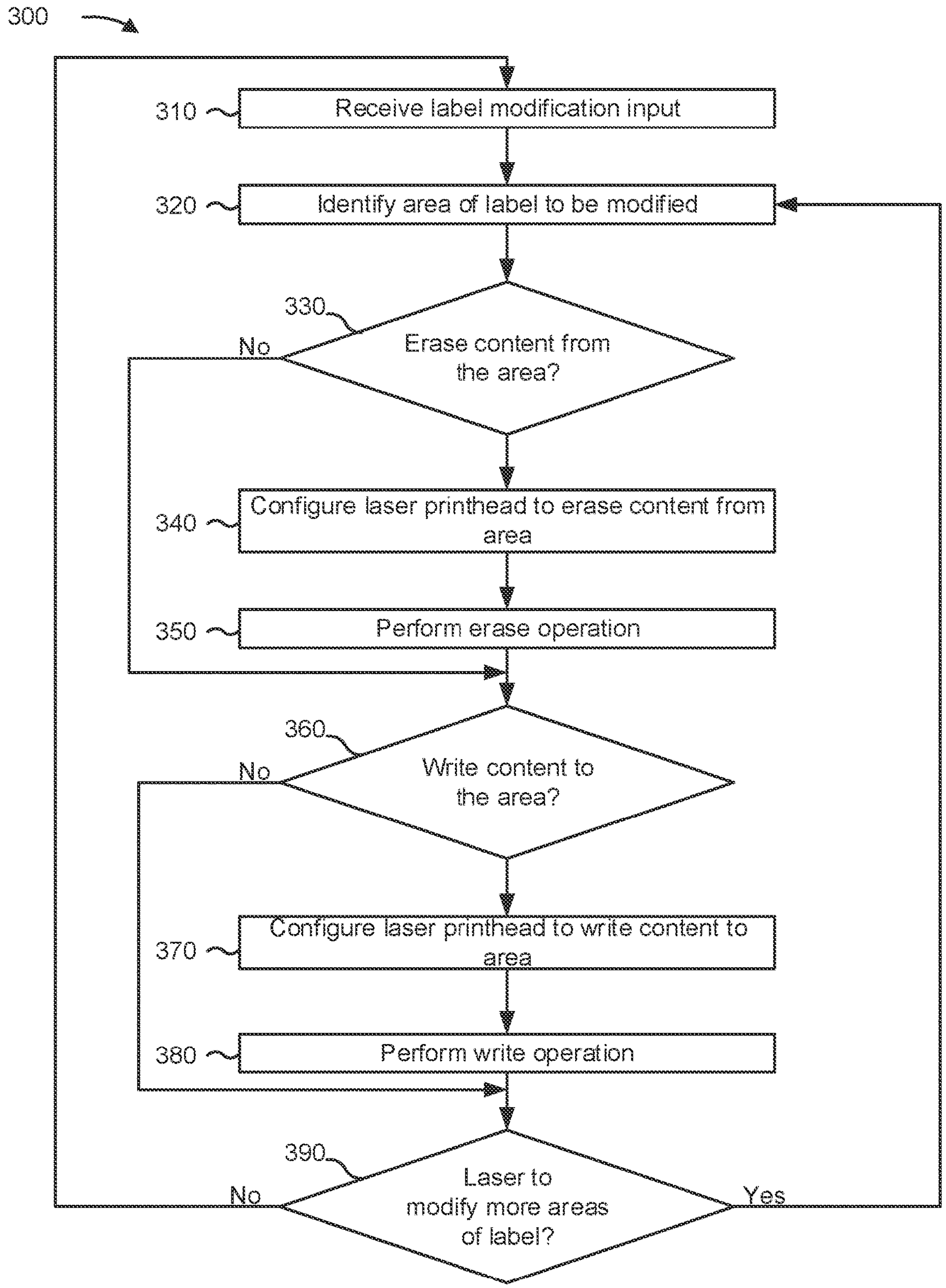
FIG. 3 is a flowchart of an example process associated with modifying an area of a rewriteable label.

FIG. 3 is a flowchart of an example process associated with modifying an area of a rewriteable label. The example implementation of FIG. 3 includes an iterative process 300 that may be performed by a label modification unit (e.g., the label modification unit of example implementation 100 and/or 200) that includes a single laser printhead for writing and erasing content. The example process 300 may be performed by a controller of the label modification unit and/or an label modification system, as described herein.

As shown in FIG. 3, at block 310, the controller receives label modification information. For example, the label modification input may include content that is to be erased from the rewriteable label, content that is to be written to the rewriteable label, information regarding one or more areas of the rewriteable label that are to be modified (e.g., coordinates relative to the rewriteable label and/or laser printhead), a location of the rewriteable label, a physical configuration of the rewriteable label, content that is displayed on the rewriteable label, and/or the like.

At block 320, the controller identifies an area of a label to be modified. The identification may be based on content information provided in the label modification input. The area may correspond to a pixel and/or portion of the rewriteable label that is to be modified to display content of the label modification input.

At block 330, the controller determines whether to erase content from the area. For example, the controller may determine that the label modification unit is to erase the content based on the label modification input and/or the content that is displayed on the rewriteable label. In such a case, if the area is blank and the label modification input indicates that the area is to remain blank (e.g., that the area is not to include content), the controller may determine not to erase content from the area, and control advances to block 360. Additionally, if the area is not blank and the controller determines form the label modification input that the area is to include content, the controller may determine that the area is not to be erased (e.g., to permit the content of the area to be reused), and control would advance to block 360. However, if, at block 330, the label modification input indicates that the area is to be blank (or erased) and/or the area includes content, the controller, at block 340, configures the laser printhead to erase content from the area. For example, the controller may configure a spot size, a power level, a dwell time, a movement rate, and/or the like to erase content from the area. At block 350, the controller performs an erase operation by correspondingly emitting the light beam and/or controlling the spot size, the focus, and/or directional movement of the light beam over the area to erase the area.

At block 360, the controller determines whether to write content to the area. For example, the controller may determine whether to write content to the area based on the label modification input indicating that the area is to include content. If the label modification input indicates that the area is not to include content, control advances to block 390. If, at block 360, the controller determines that content is to be written the area, at block 370, the controller configures the laser printhead to write content to the area. For example, the controller may configure a spot size, a power level, a dwell time, a movement rate, and/or the like to write content to the area. At block 380, the controller performs a write operation by correspondingly emitting the light beam and/or controlling the spot size, the focus, and/or directional movement of the light beam over the area to erase the area.

At block 390, the controller may determine whether the laser printhead is to modify other areas of the label. If the controller determines that other areas are to be modified (e.g., the modification to the rewriteable label is not complete), control returns to block 320 to iteratively modify a next area of the rewriteable label. On the hand, if the controller determines that no other areas are to be modified (e.g., the modification to the rewriteable label is complete), control may return to block 310 to permit modification of a next rewriteable label.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
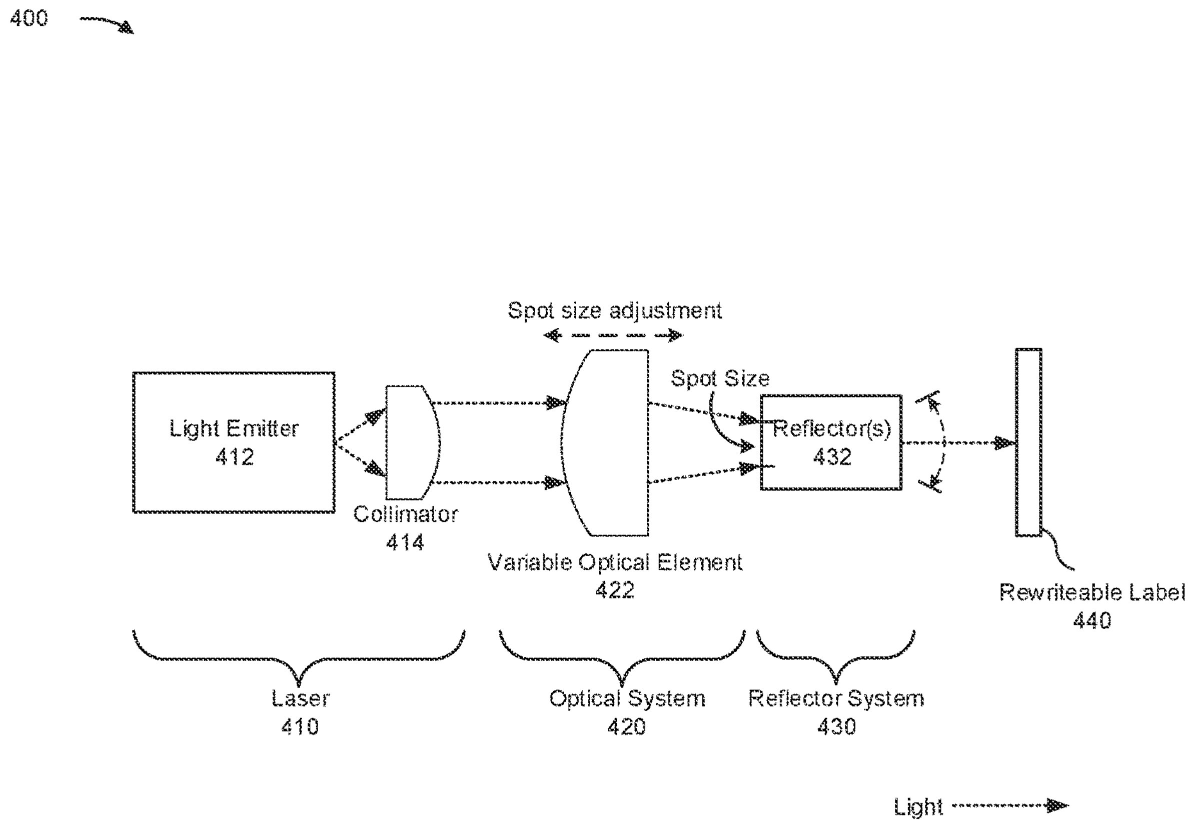
FIG. 4 is a diagram of an example implementation of a laser printhead described herein.

FIG. 4 is a diagram of an example implementation of a laser printhead 400 described herein. The laser printhead 400 may be a printhead of the label modification unit of example implementations 100 and/or 200 and/or correspond to the laser printhead of example process 300. As shown in FIG. 4, the laser printhead includes a laser 410 that has a light emitter 412 and a collimeter 414, an optical system 420 that includes a variable optical element 422, and a reflector system that includes one or more reflectors 432. FIG. 4 further illustrates an optical path of a light beam formed from light being emitted by the laser, adjusted or focused by the optical system 420, and directed by the reflector system 430 to modify a rewriteable label 440 (e.g., corresponding to the rewriteable label of example implementations The light emitter 412 may generate light that can be focused by the collimeter 414 into a light beam that has a particular power (e.g., that may be based on supplied power and/or an optical configuration of the collimeter 414). The collimeter 414 may include a fixed lens (e.g., an F-theta lens) to focus the light beam according to one or more desired attributes (e.g., so that a consistent light beam is provided to the optical system 420). Accordingly, the laser 410 may output a light beam to the optical system 420, which may uses the variable optical element 422 to focus the light beam to have a particular spot size. As shown, the variable optical element 422 may perform a spot size adjustment based on movement of the variable optical element 422 relative to the laser 410 and/or adjusting a shape and/or configuration of the variable optical element 422. Accordingly, the variable optical element 422 can include any suitable reconfigurable optical element that can adjust a focus of the light beam (e.g., rotatable lenses, liquid lenses, and/or the like).

The reflector system 430 may include one or more reflectors 432 (referred to collectively as "reflectors 432" and individually as "reflector 432") to redirect the light beam emitted by the laser. The reflector 432 may include an actuatable and/or adjustable mirror, a reflective material, and/or the like that may be used to reflect and/or direct the light beam toward a particular direction. The reflectors 432 may be controlled to move as a function of time or another variable.

As shown in FIG. 4, light is emitted, during a write operation or erase operation, from the light emitter 412 and focused into a light beam by the collimeter 414. The light beam is to pass through the variable optical element 422, which may adjust (e.g., according to a position or shape) to vary a spot size, focus, and/or power density of the light beam. The light beam is to further pass through one or more reflectors 432 to be directed onto a particular area or position of the rewriteable label 440 to modify content of the rewriteable label. In this way, the laser printhead 400 can be controlled to sweep light beams with various attributes over areas of the rewriteable label 440 to correspondingly write content or erase content.

As indicated above, FIG. 4 is provided merely as an example. Other examples may differ from what is described with regard to FIG. 4.

Figure 5:
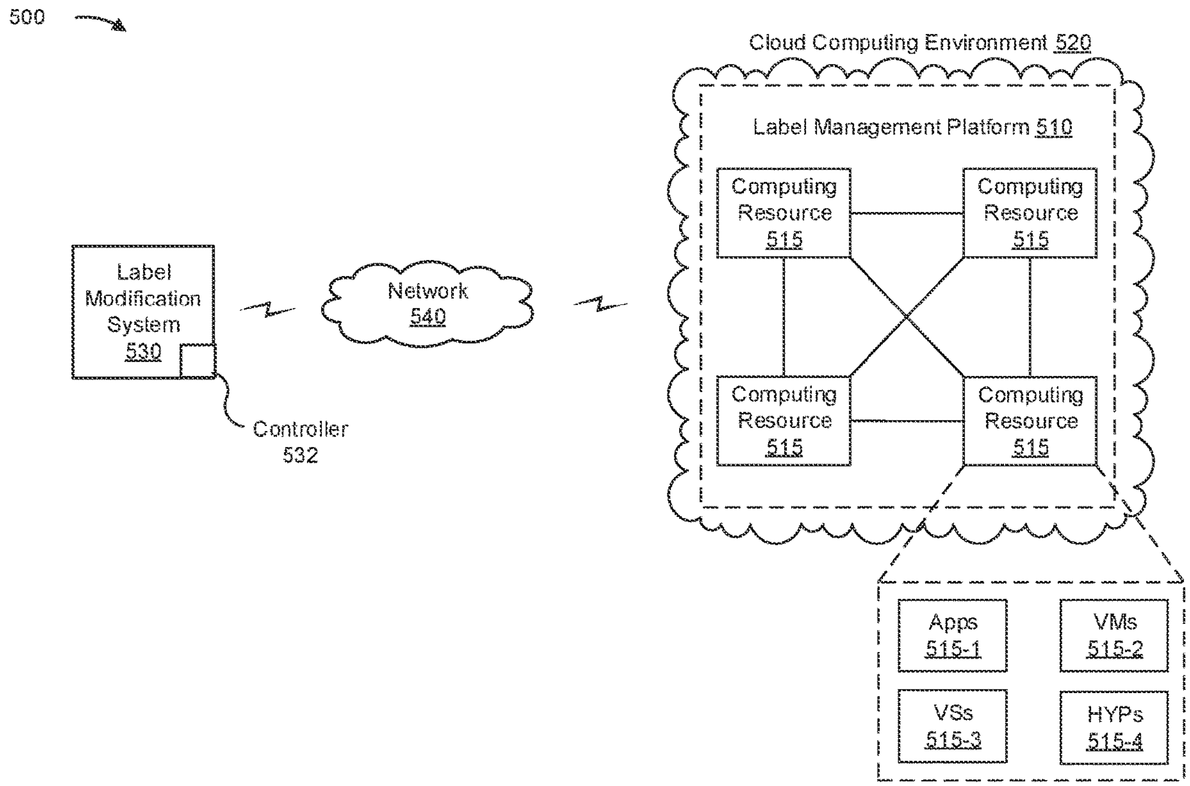
FIG. 5 is a diagram of an example environment in which systems and/or methods described herein may be implemented.

FIG. 5 is a diagram of an example environment 500 in which systems and/or methods, described herein, may be implemented. As shown in FIG. 5, environment 500 may include a label management platform 510 (e.g., the label management platform of example implementation 100) that is hosted by computing resources 515 of a cloud computing environment 520, a label modification system 530 (e.g., the label modification system of example implementation 100) with a controller 532 (e.g., corresponding to the controller of example implementation 100), and a network 540. Devices of the environment 500 may interconnect via wired connections, wireless connections, or a combination of wired and wireless connections.

The label management platform 510 includes one or more devices that manage information associated with labelling one or more rewriteable labels of an environment, as described herein. In some implementations, the label management platform 510 may be designed to be modular such that certain software components may be swapped in or out depending on a particular need. As such, the label management platform 510 may be easily and/or quickly reconfigured for different uses. The label management platform 510 may receive information from and/or transmit information to label modification system 530 (and/or the controller 532), as described herein.

In some implementations, as shown, the label management platform 510 may be hosted in the cloud computing environment 520. Notably, while implementations described herein describe the label management platform 510 as being hosted in the cloud computing environment 520, in some implementations, the label management platform 510 may not be cloud-based (i.e., may be implemented outside of a cloud computing environment) or may be partially cloud-based.

The cloud computing environment 520 includes an environment that hosts the label management platform 510. The cloud computing environment 520 may provide computation, software, data access, storage, etc., services that do not require end-user knowledge of a physical location and configuration of system(s) and/or device(s) that hosts the label management platform 510. As shown, the cloud computing environment 520 may include a group of the computing resources 515 (referred to collectively as "computing resources 515" and individually as "computing resource 515").

The computing resource 515 includes one or more personal computers, workstation computers, mainframe devices, or other types of computation and/or communication devices. In some implementations, the computing resource 515 may host the label management platform 510. The cloud resources may include compute instances executing in the computing resource 515, storage devices provided in the computing resource 515, data transfer devices provided by the computing resource 515, etc. In some implementations, a computing resource 515 may communicate with other computing resources 515 via wired connections, wireless connections, or a combination of wired and wireless connections.

As further shown in FIG. 5, one or more of the computing resources 515 may include a group of cloud resources, such as one or more applications ("APPs") 515-1, one or more virtual machines ("VMs") 515-2, virtualized storage ("VSs") 515-3, one or more hypervisors ("HYPs") 515-4, and/or the like.

The application 515-1 includes one or more software applications that may be provided to or accessed by the label management platform 510. The application 515-1 may eliminate a need to install and execute the software applications on the label management platform 510. For example, application 515-1 may include software associated with the label management platform 510 and/or any other software capable of being provided via the cloud computing environment 520. In some implementations, one application 515-1 may send/receive information to/from one or more other applications 515-1 via virtual machine 515-2.

The virtual machine 515-2 includes a software implementation of a machine (e.g., a computer) that executes programs like a physical machine. The virtual machine 515-2 may be either a system virtual machine or a process virtual machine, depending upon use and degree of correspondence to any real machine by the virtual machine 515-2. A system virtual machine may provide a complete system platform that supports execution of a complete operating system ("OS"). A process virtual machine may execute a single program and may support a single process. In some implementations, the virtual machine 515-2 may execute on behalf of a user (e.g., an operator of the label management platform 510), and may manage infrastructure of the cloud computing environment 520, such as data management, synchronization, or long-duration data transfers.

The virtualized storage 515-3 includes one or more storage systems and/or one or more devices that use virtualization techniques within the storage systems or devices of the computing resource 515. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 515-4 may provide hardware virtualization techniques that allow multiple operating systems (e.g., "guest operating systems") to execute concurrently on a host computer, such as computing resource 515. The hypervisor 515-4 may present a virtual operating platform to the guest operating systems and may manage the execution of the guest operating systems. Multiple instances of a variety of operating systems may share virtualized hardware resources.

The label modification system 530 includes a system for modifying a rewriteable label. The label modification system 530 includes the controller 532, which is configured to control the label modification system 530 to navigate (e.g., autonomously or semi-autonomously) to one or more rewriteable labels via one or more motors and/or drives. Furthermore, the label modification system 530 may include a label modification unit (e.g., the label modification unit of FIG. 1) that includes a laser printhead (e.g., a single laser printhead) that can be controlled by the controller 532 to modify (e.g., autonomously or semi-autonomously based on a label modification input) one or more rewriteable labels via the label modification unit. The controller 532 may include one or more devices (e.g., one or more processors, one or more memories, and/or the like) that are capable of controlling one or more components of the label modification system 530, as described herein. Accordingly, the label modification system 530 may include and/or control a laser printhead to adjust attributes of a light beam that is emitted and/or directed by the laser printhead to write and/or erase a rewriteable label, as described herein.

The network 540 includes one or more wired and/or wireless networks. For example, the network 540 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 5 are provided as one or more examples. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
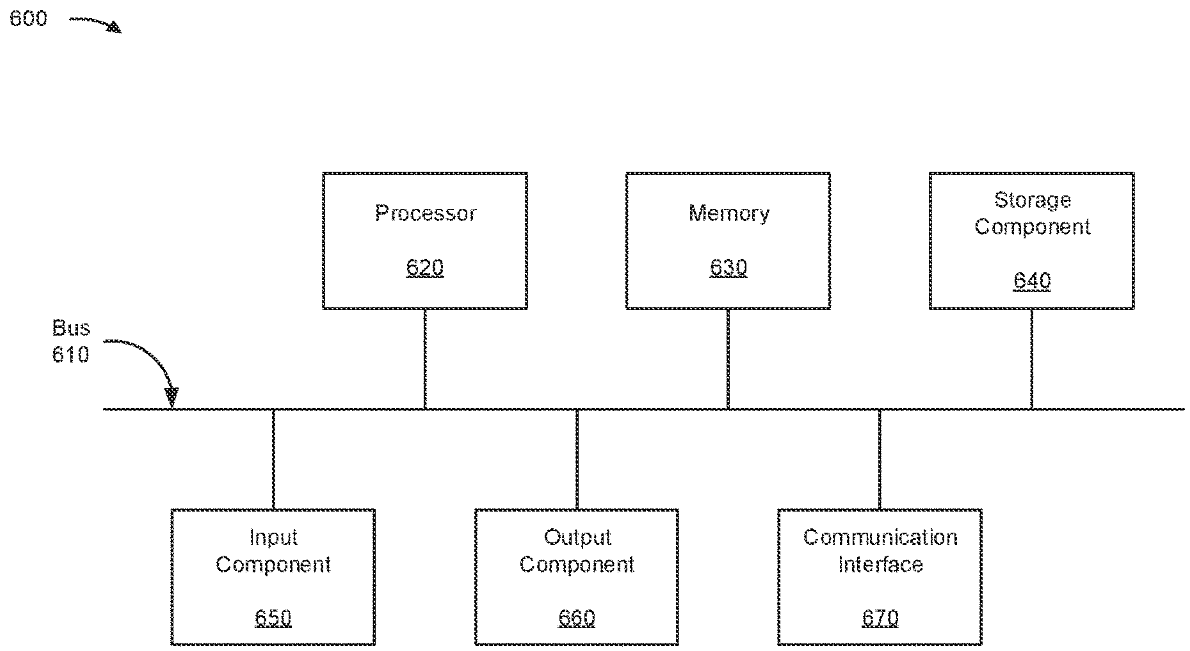
FIG. 6 is a diagram of example components of one or more devices of FIG. 5.

FIG. 6 is a diagram of example components of a device 600. Device 600 may correspond to the label management platform 510, the label modification system 530, the controller 532, and/or the like. In some implementations, the label management platform 510, the label modification system 530, and/or the controller 532 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among multiple components of device 600. Processor 620 is implemented in hardware, firmware, and/or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like) to navigate and/or control the label modification system 530. Output component 660 includes a component that provides output information from device 600 (via, e.g., a display, a speaker, a haptic feedback component, an audio or visual indicator, and/or the like). Additionally, or alternatively, output component 660 may include and/or be associated with components of the label modification unit and/or one or more control devices (e.g., electromechanical devices) configured to control components of the label modification unit and/or components of the placement device of example implementation 100.

Communication interface 670 includes a transceiver-like component (e.g., a transceiver, a separate receiver, a separate transmitter, and/or the like) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a wireless local area network interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. As used herein, the term "computer-readable medium" refers to a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
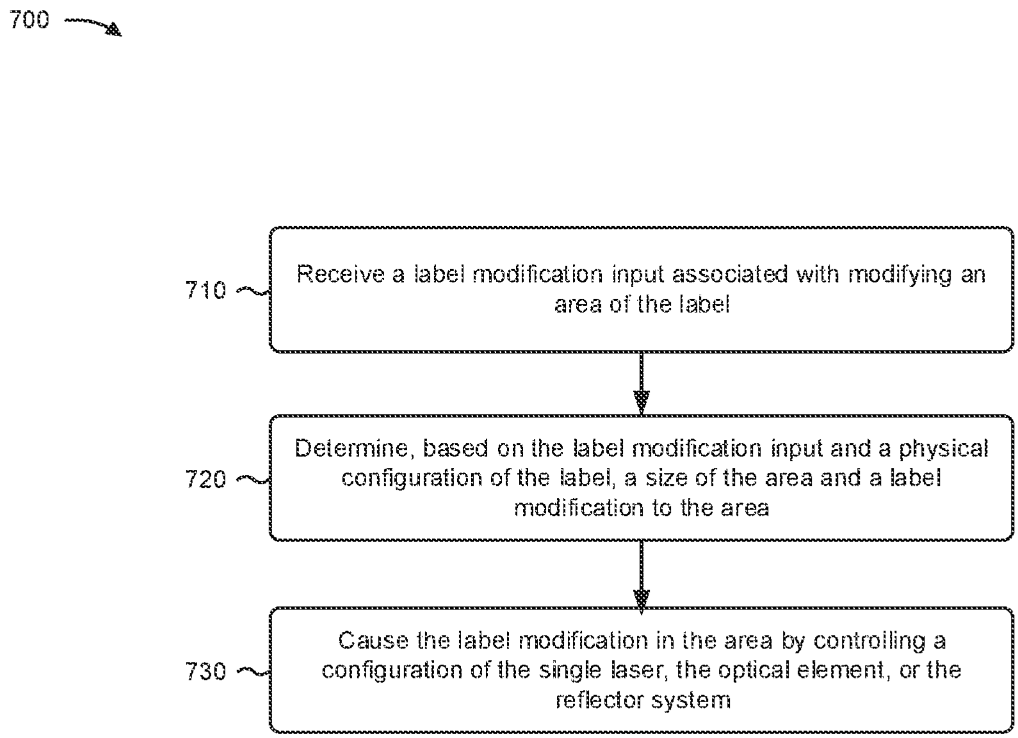
FIG. 7 is a flowchart of an example process for control of a laser printhead for erasing and writing content.

FIG. 7 is a flowchart of an example process 700 for control of laser printhead for writing or erasing content. In some implementations, one or more process blocks of FIG. 7 may be performed by a label modification system (e.g., label modification system 530 and/or a controller of label modification system 530). In some implementations, one or more process blocks of FIG. 7 may be performed by another device or a group of devices separate from or including the device, such as a label management platform (e.g., label management platform 510) and/or the like.

As shown in FIG. 7, process 700 may include receiving a label modification input associated with modifying an area of the label (block 710). For example, the label modification system (e.g., using the controller 532, the processor 620, the memory 630, the storage component 640, the input component 650, the output component 660, the communication interface 670, and/or the like) may receive a label modification input that includes a label modification and/or indicates whether content is to be written to a label or erased from the label, as described above.

In some implementations, the label is a rewritable label and the content is modifiable based on writing the content to a portion of the area and/or erasing the content from a portion of the area. The label modification system may identify the area of the label that is to be modified according to the label modification input.

As further shown in FIG. 7, process 700 may include determining, based on the label modification input and a physical configuration of the label, a size of the area and a label modification to the area (block 720). For example, the label modification system (e.g., using the processor 620, the memory 630, the storage component 640, the input component 650, the output component 660, the communication interface 670, and/or the like) may determine the size of the area and the label modification to the area, as described above.

In some implementations, content of the label modification is associated with an image depicted by one or more pixels, and the size of the area is based on the one or more pixels in the area and a size of the label.

The label modification system may determine, based on a size of the area, a spot size of a light beam that is to be emitted by a laser printhead to modify the content within the area. Additionally, or alternatively, the label modification system may determine the size of the area based on a quantity of pixels in an image associated with the content, determine a size of the label, and determine the size of the area based on the size of the label and the quantity of pixels. The spot size of the light beam may be less than or equal to the size of the area.

The label modification system may determine whether the content is to be written to the area or erased from the area and determine the spot size based on whether the content is to be written to the area or erased from the area. In some implementations, the spot size of the light beam is to be relatively smaller to perform a write operation associated with the size of the area and relatively larger to perform an erase operation associated with the size of the area. The spot size of the light beam may be less than or equal to the size of the area.

As further shown in FIG. 7, process 700 may include causing the content in the area to be modified by controlling a configuration of a single laser, an optical element, or a reflector system (block 730). For example, the label modification system (e.g., using the processor 620, the memory 630, the storage component 640, the input component 650, the output component 660, the communication interface 670, and/or the like) may cause the content in the area to be modified by controlling a configuration of the single laser, the optical element, or the reflector system, as described above.

The label modification system may determine, based on the spot size and the content, an optical path configuration for a laser printhead (e.g., that includes the laser, the optical system, and the reflector system). In some implementations, the label modification system, when determining the optical path configuration, may determine, based on the spot size and the content, a power level of the light beam to write or erase the content in the area and generate the optical path configuration according to the power level. In some implementations, the optical path configuration includes information that identifies a duration of time associated with operating the laser printhead to emit the light beam over the area or a movement rate for operating the laser to emit the light beam between portions of the area. In some implementations, process 700 includes identifying a power level associated with a laser emitting the light beam on the area.

The label modification system may operate the laser printhead according to the optical path configuration to write the content to the area or erase the content from the area. In some implementations, when the label modification input indicates that the content is to be written to the area, the optical path configuration is to cause the laser printhead to heat the area to a writing temperature and cool the area at a writing rate. The writing temperature may be warmer than an erasing temperature for an erase operation associated with the label and the writing rate may be faster than an erasing rate for the erase operation. Additionally, or alternatively, the erasing temperature may be cooler than a writing temperature for a write operation associated with the label and the erasing rate may be slower than a writing rate for the write operation. In some implementations, the label modification system may operate the laser printhead by controlling a power level of the light beam, controlling a position of an optical element to focus the light beam or adjust the spot size, and/or controlling a position of a reflector to cause the light beam to be directed at the area.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A label modification unit comprising:
- a single laser of one laser printhead configured to emit a light beam to modify content in an area of a label;
- an optical element configured to control a spot size of the light beam;
- a reflector system configured to control directional movement of the light beam; and
- a controller configured to:
  - receive an input associated with modifying the content in the area of the label;
  - determine, based on the input and a physical configuration of the label, a size of the area of the label and a modification to the content in the area of the label; and
  - modify, based on the determined modification, the content in the area of the label by controlling a configuration of the single laser, the optical element, or the reflector system to write the content to at least a portion of the area of the label or erase the content from at least a portion of the area of the label.

2. The label modification unit of claim 1, wherein the spot size of the light beam is configured to be less than or equal to the size of the area of the label.

3. The label modification unit of claim 1, wherein the configuration includes:

an optical path configuration that identifies at least one of a spot size to modify the content in the area of the label or a movement rate to modify the content in the area of the label, and a laser configuration that identifies a power level of the light beam.

4. The label modification unit of claim 1, wherein the label is rewritable.

5. The label modification unit of claim 1, wherein the controller, when modifying the content in the area of the label, is configured to control at least one of:

a power level of the light beam, a position of an optical element to adjust the spot size, and a position of one or more reflectors of the reflector system to cause the light beam to be moved within the area of the label.

6. The label modification unit of claim 1, wherein the label is a thermally sensitive rewritable label.

* * * * *